US008495297B2

(12) United States Patent
See et al.

(10) Patent No.: US 8,495,297 B2
(45) Date of Patent: Jul. 23, 2013

(54) REMOVABLE MEDIA STORAGE DEVICE FOR A VIDEO RECORDING OR REPRODUCING DEVICE

(75) Inventors: Yee Kiat See, Singapore (SG); Jack Ping Chng, Penang (MY); Chee Yang Lim, Singapore (SG)

(73) Assignee: Thomson Licensing (FR)

( * ) Notice: Subject to any disclaimer, the term of this patent is extended or adjusted under 35 U.S.C. 154(b) by 616 days.

(21) Appl. No.: 10/561,360

(22) PCT Filed: Jun. 15, 2004

(86) PCT No.: PCT/EP2004/006392
§ 371 (c)(1),
(2), (4) Date: Mar. 15, 2007

(87) PCT Pub. No.: WO2005/004462
PCT Pub. Date: Jan. 13, 2005

(65) Prior Publication Data
US 2007/0206232 A1 Sep. 6, 2007

(30) Foreign Application Priority Data
Jun. 30, 2003 (EP) .................................. 03291611

(51) Int. Cl.
*G06F 13/00* (2006.01)
(52) U.S. Cl.
USPC ............... 711/115; 711/156; 710/17; 710/19
(58) Field of Classification Search
USPC ................................................. 711/115, 156
See application file for complete search history.

(56) References Cited

U.S. PATENT DOCUMENTS

| 3,619,585 | A | * | 11/1971 | Edmondson ................... 714/708 |
| 5,412,798 | A | * | 5/1995 | Garney ......................... 719/321 |
| 5,661,823 | A | * | 8/1997 | Yamauchi et al. ............ 382/239 |
| 6,243,774 | B1 | * | 6/2001 | Eide et al. ..................... 710/302 |
| 6,446,177 | B1 | | 9/2002 | Tanaka et al. |
| 2002/0110073 | A1 | | 8/2002 | Shu et al. |
| 2006/0031612 | A1 | * | 2/2006 | Bashford et al. ................ 710/74 |

FOREIGN PATENT DOCUMENTS
EP 1030518 8/2000
WO WO 02/23885 3/2002

OTHER PUBLICATIONS

Search Report Dated Oct. 6, 2004.
Carel, "Autorun from Floppy Drives", http://www.ashzfall.com/products/autorun/autorunfloppy.html, Feb. 4, 2002, pp. 1-3.

(Continued)

*Primary Examiner* — Jared Rutz
*Assistant Examiner* — Nicholas Simonetti
(74) *Attorney, Agent, or Firm* — Jack Schwartz and Associates, PLLC

(57) ABSTRACT

The invention refers to a method for indicating the current status of a removable media device provided for being loaded with at least one removable medium, and being connected to a device reading and/or writing AV storage media. The method has the steps of
 checking the type of user input upon occurrence of user input,
 keeping the status of the removable media device if the type of user input is not related to the removable media device,
 else checking whether a characteristic feature of the at least one removable medium has changed,
 keeping the current status if the characteristic feature of the at least one removable medium has not changed, and
 else updating the status.

12 Claims, 7 Drawing Sheets

OTHER PUBLICATIONS

Figure 1:
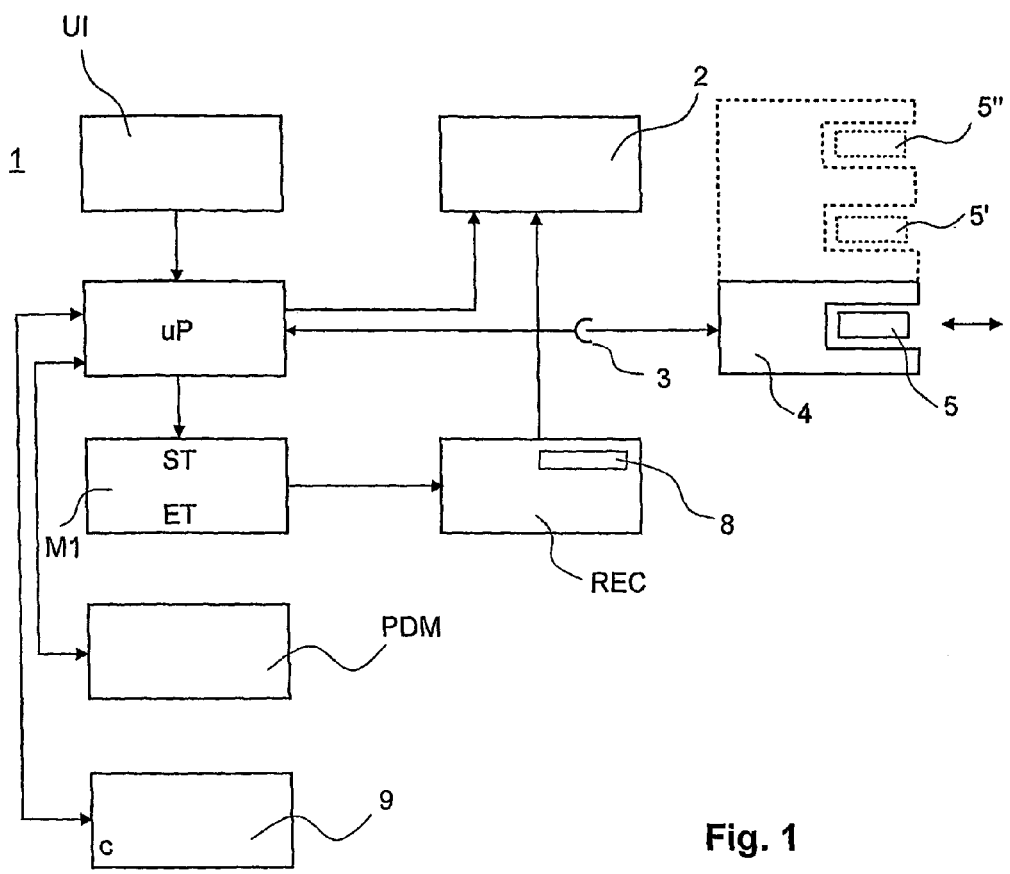

Linux, S. A., "Linux Tips: Accessing Removable Media", http://www.linuxsa.org.au/tips/removable-media.html, Sep. 15, 1998, pp. 1-2.

Weedall, Christopher, "Device and Driver Management and Configuration", http://people.msoe.edu/~taylor/cs384/weedallc.pdf, Feb. 2, 2003, pp. 1-24.

* cited by examiner

Fig. 5a

```
CH:    --
STD:   --:--   am/pm        EDT:  --:--   am/pm
Day:   D0   D1   D2   D3   D4   D5   D6   D7
       WR
OK
```

Fig. 5b

```
CH:    01
STD:   13:56                EDT:  14:56
Day:   D0   D1   D2   D3   D4   D5   D6   D7
       WR
OK
```

Fig. 5c

```
CH:    01
STD:   08:20  am/pm         EDT:  10:20  am/pm
Day:   D0   D1   D2   D3   D4   D5   D6   D7
       WR
OK
```

Fig. 5d

```
CH:    --
STD:   08:20  am/pm         EDT:  10:20  am/pm
Day:   D0   D1   D2   D3   D4   D5   D6   D7
       WR
OK
```

Fig. 5e

```
CH:    --
STD:   10:00  am/pm         EDT:  11:00  am/pm
Day:   D0   D1   D2   D3   D4   D5   D6   D7
       WR
OK
```

REMOVABLE MEDIA STORAGE DEVICE FOR A VIDEO RECORDING OR REPRODUCING DEVICE

The invention refers to a video recording or reproducing device, especially to a disk recording device like hard disk recorder or optical disk recorder, often referred to as PVR or DVD recording device.

It is an object of the invention to improve behaviour of such video recording or reproducing device, especially in connection with a removable media device which is provided for being loaded with at least one removable medium.

According to the invention, a method for indicating the current status has the steps of checking the type of user input upon occurrence of a user input, and keeping the status of the removable media device if the type of user input is not related to the removable media device. In case the type of user input is related to the removable media device, a characteristic feature of the at least one removable medium is checked for a change. The removable medium, as e.g. a flash memory card, may have been removed or inserted, it may have been written to or another change may have occurred. In case no change is detected the status is kept, else the status is updated. This has the advantage that it allows for quickly performing an update of the status where necessary, without spending unnecessarily processor time for updates that are most likely not used or not required by the user. Only in those cases, where such use or request is likely, the updating process is performed. The saved processor time is used for other tasks so that the overall performance of the device is increased.

The characteristic feature to be checked preferably is an identifier of the medium. This has the advantage, that the check is performed quickly as an identifier of the medium is easy to detect and to compare. In case that no identifier of the medium, such as volume identifier, is present, then other characteristic features such as the file structure or a part of the file structure, or data at certain predefined address or at several such predefined addresses is compared. Although this takes longer and may be less reliable due to possibility of random identity, even this approach turns out to be quicker than checking everything every time, and it is more reliable than not performing a check at all.

Preferably, user input types related to the removable media device are one or more of the following, not necessarily complete list of commands: An input command to enter the removable media device sub-menu has the advantage that it clearly indicates that the user wants to have up-to-date information about the removable medium. An input command that caused navigation within a removable media device sub-menu is preferably used as the user might have changed the medium when being in the respective sub-menu but not performing any other tasks therein. An input command to access a removable medium is preferably taken because wrong information in this state of the device would lead to impossibility of performing the respective task. An input command that is generally preceding an access to a removable medium is preferably used in order to pro-actively update the status when the necessity to have such update is likely, even if it is not always required. This has the advantage that the updating can be done in the background and when the access actually is requested, the update is already performed, no unnecessary processing time is needed then.

According to the invention a change of characteristic feature of the at least one removable medium is performed repeatedly in case that an error status such as wrong data type on the removable medium or wrong type of removable medium has been detected. In such case there is given a message to the user asking to reconnect the media device or to reinsert the removable medium in order to correct errors that occurred by chance. In this case it is preferable to do the update as soon as possible, without taking into account possible time delays.

In case of a multicard reader type media device each single change is reflected when performing the check of identifiers for all removable media of the media device.

According to the invention the file structure of all inserted removable media of a multicard reader type media device are read out and assembled to a single file structure. This has the advantage that no overhead information for different media needs to be displayed, like header for medium 5, header for medium 5', header for medium 5'' and so on. Thus, space on a display is saved for more important information, which is for example the file structure per se. Of course, updates as indicated above are performed also in this case.

An inventive device preferably is provided with a controller for performing the inventive method.

Figure 6:
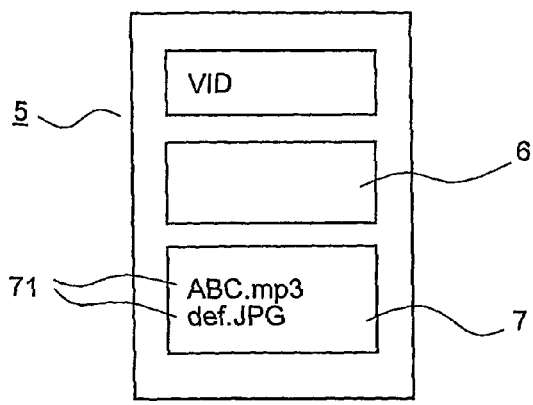
Figure 2:
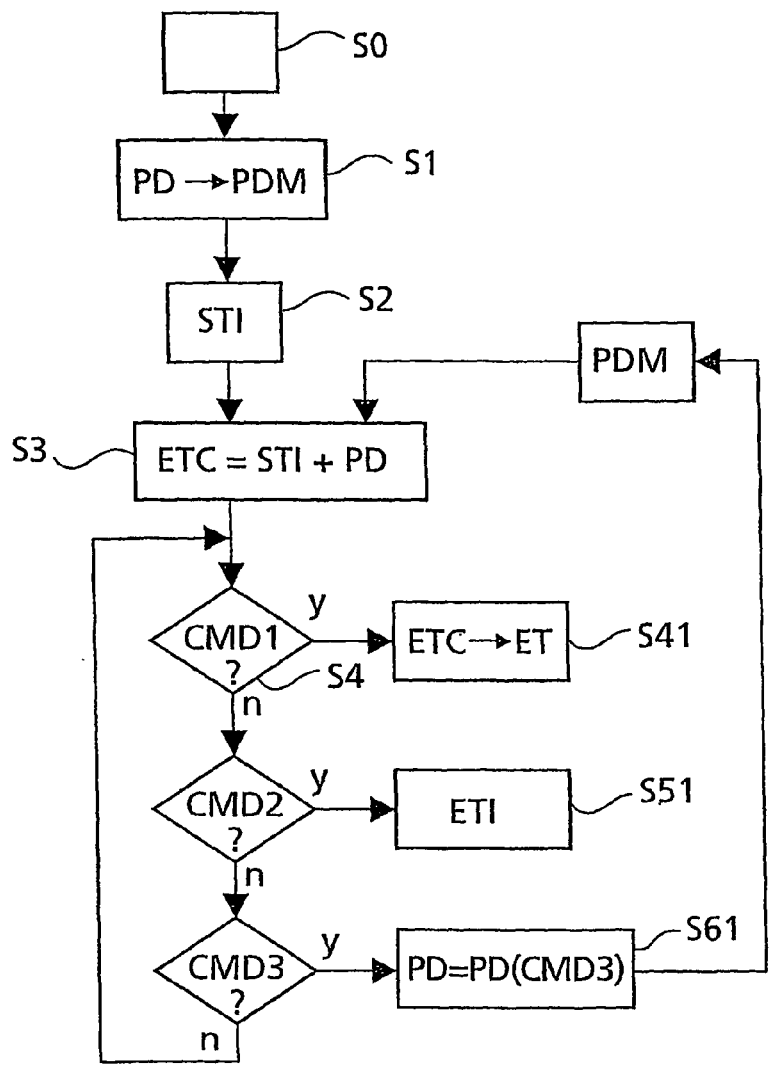
Figure 3:
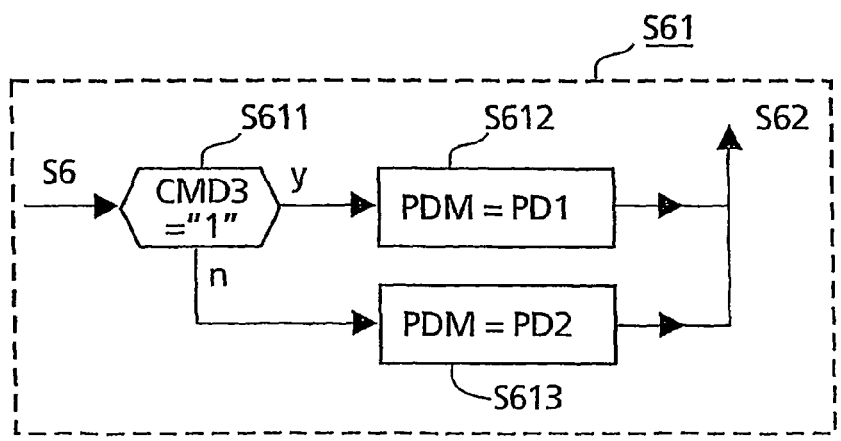
Figure 7:
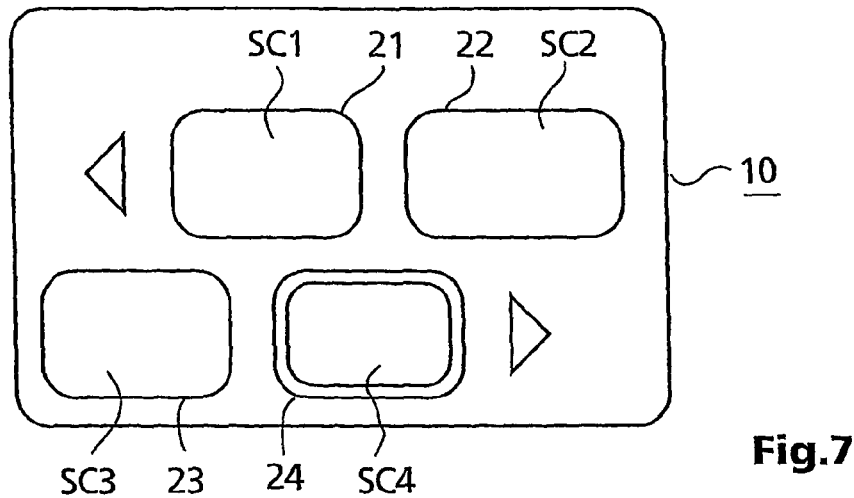
Figure 4:
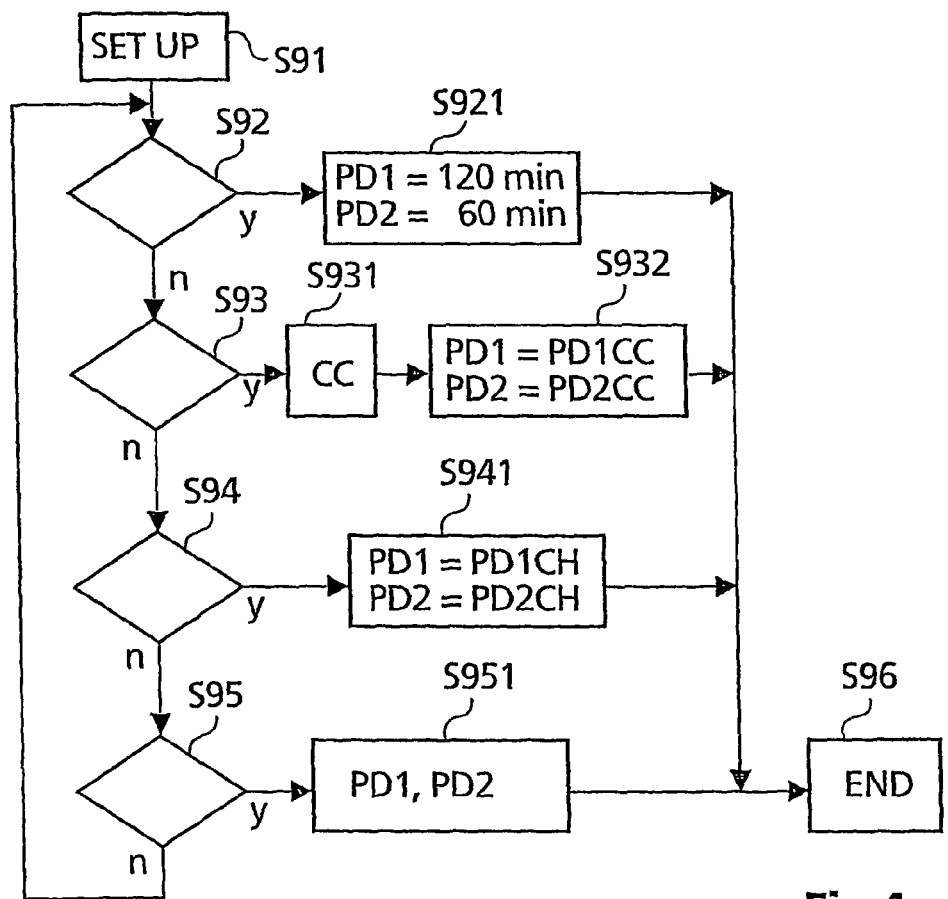
Figure 8:
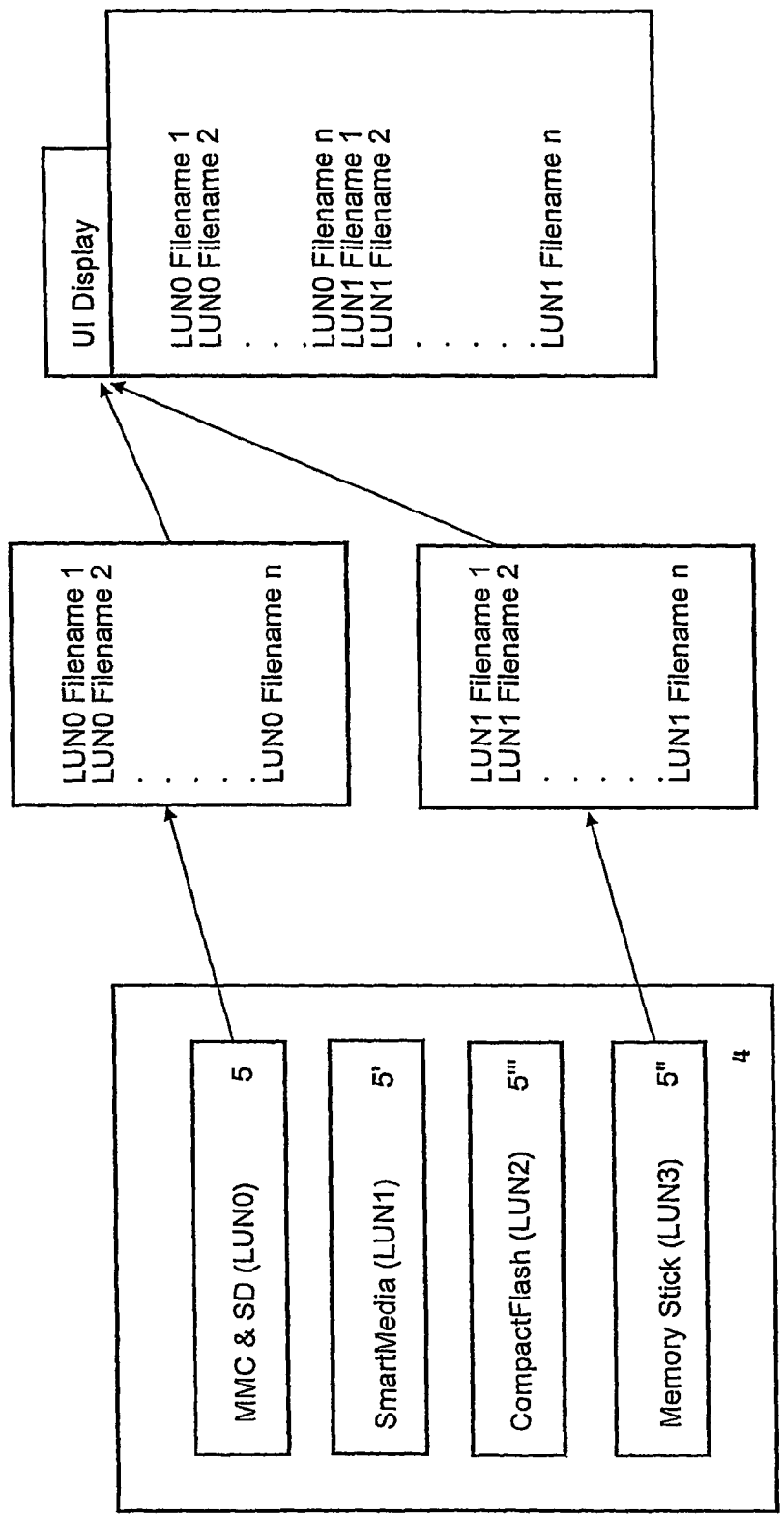
Figure 9:
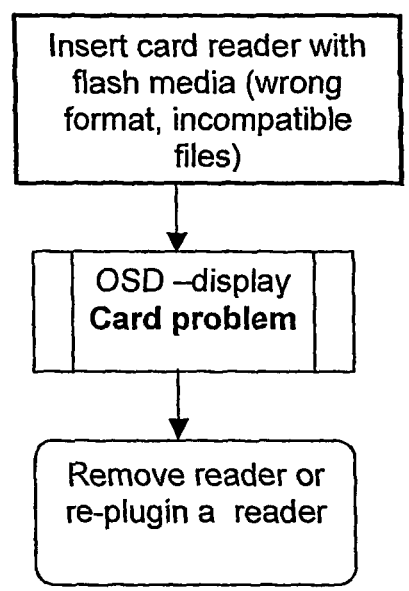
Figure 10:
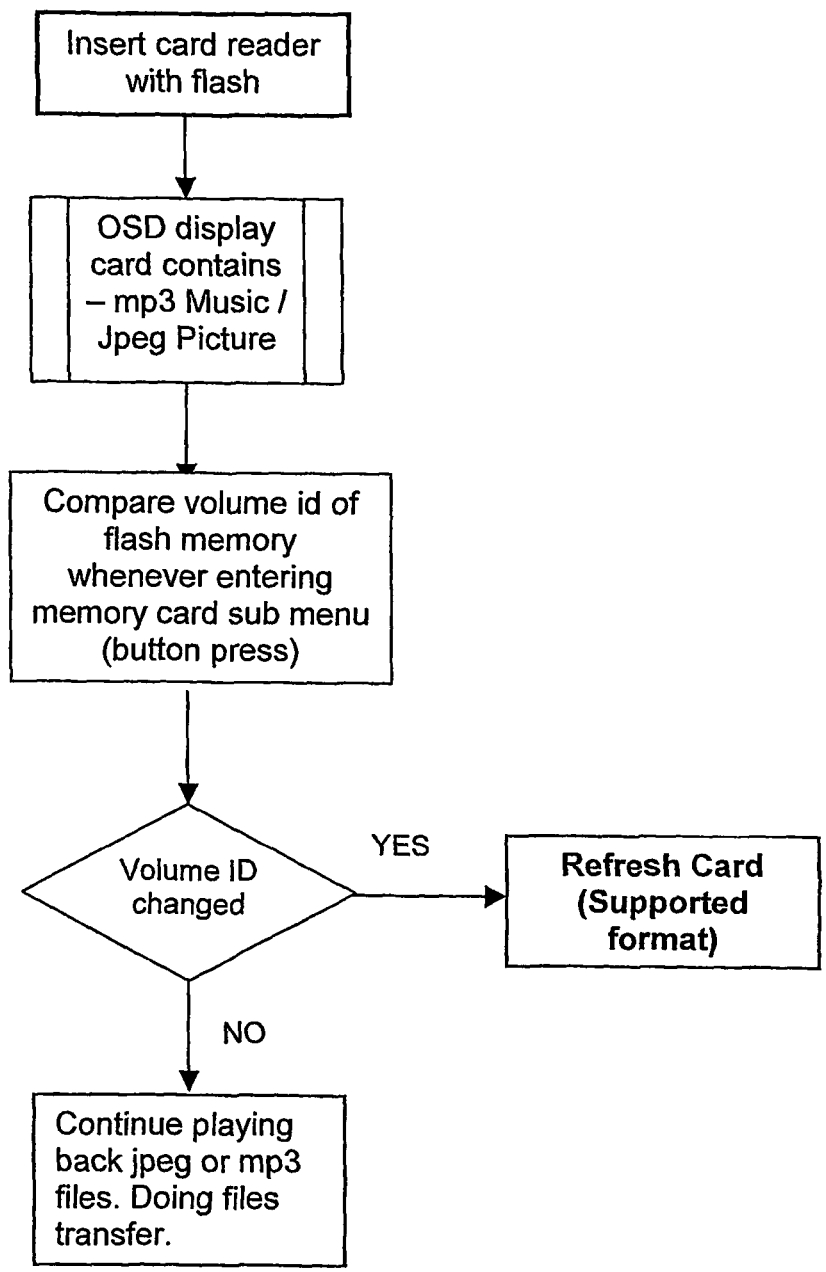

Further advantages can be taken from the description of preferred embodiments. Of course, different combinations of features than those described are also in the scope of the invention. The figures show:

FIG. 1 schematics of an inventive device,
FIG. 2 timer programming method,
FIG. 3 detail of the timer programming method,
FIG. 4 set-up recording timer programming,
FIG. 5*a*-5*e* different displays during timer programming,
FIG. 6 content of a removable medium,
FIG. 7 menu,
FIG. 8 block diagram,
FIG. 9 flow chart,
FIG. 10 flow chart.

FIG. 1 shows a schematic view of video recording device 1. A recording and playback section REC outputs a playback signal to a display 2. The display 2 is also provided for displaying a timer menu as provided by a microprocessor uP. The microprocessor uP receives commands from a user interface UI and transfers start time ST and end time ET to a memory M1. In dependency on the times ST, ET set in memory M1 the recording and playback section REC starts and ends recording if timer mode is selected. The microprocessor is also connected to a predetermined duration memory PDM for receiving a predetermined duration PD and for calculating an end time ETC therefrom and from an input start time STI. A disk as recording medium 8 is shown inserted into recording and playback section REC. It may be a removable disk as DVD or a hard disk. The device 1 is also provided with a further memory 9. The device 1 has also a link 3 through which an external removable media device 4 for removable media 5 is connectable to and disconnectable from the device 1.

FIG. 2 shows an example of an inventive timer programming method. After the start in step S0 a standard predetermined duration PD is set in a predetermined duration memory PDM in step S1. In step S2 an input start time STI is received. In step S3 a calculated end time ETC is computed as ETC=STI+PD. In step S4 it is checked whether an end type command CMD1 is received. In this case the calculated end time ETC is taken as end time ET in step S41 and the timer programming is ended. Otherwise, it is checked in step S5 whether a second type command CMD2 is received. If such command is received, in step S51 the timer programming is continued without further calculating an end time ETC. When the timer program is finished after step S51, the end time ET is taken as an input end time ETI or, if such is not present, the last calculated end time ETC is taken. If the condition of step S5 is not fulfilled, it is checked in step S6 whether a third type command CMD3 is received. If this is the case, the predetermined time PD is updated in step S61 in accordance with the command CMD3 and entered in step S62 in the predetermined duration memory PDM. If the result of step S6 is negative, i.e. if no command or a command irrelevant for the selection is received, it is returned to step S4. Preferably, a function to leave the routine after a certain time without command is implemented but not shown here.

FIG. 3 shows a detail of the timer programming method regarding the updating step S61. In step S611 it is checked whether the third type command indicates a single event recording. If this is the case, the predetermined duration memory PDM is updated with a first predetermined duration value PD1 in step S612. If in step S611 a repeated event recording is detected, the predetermined duration memory PDM is updated in step S613 with a different duration, the second predetermined duration PD2.

FIG. 4 shows a set-up procedure regarding timer programming. After set-up is started in step S91 the user's request is detected. In step S92 it is checked whether standard conditions are requested. In this case the first predetermined duration PD1 is set to 120 minutes and the second predetermined duration PD2 is set to 60 minutes in step S921. If in step S93 it is detected that country dependent determination is selected, the country information is determined in step S931. This might be by direct user input or by checking an already existing country information. Following, in step S932 first and second predetermined duration PD1, PD2 are set to country dependent values PD1CC, PD2CC. Preferably, a table indicating appropriate values for each country CC is available. In step S94 it is checked whether channel dependent determination is selected. In this case predetermined durations PD1 and PD2 are set to channel dependent values PD1CH, PD2CH in step S941. The latter are preferably taken from a respective table. In step S95 it is checked whether the user wants to determine the durations himself and the predetermined durations PD1, PD2 are received in step S951 from the user. In step S96 the predetermined durations PD1, PD2 are stored to the predetermined duration memory PDM.

FIGS. 5a to 5e show different displays during timer programming. The selected channel is indicated by CH, start time and end time are displayed as STD and ETD, the day of the timer programming is indicated by D0 to D7, wherein D0 is today, D1 is the following day, D2 the second following day and so on. A weekly repeat is indicated by WR. A confirmation command is indicated by an ok button OK. For countries where the am/pm time standard is used, such indications are given. A timer recording that shall be repeated from the next day until the 4$^{th}$ next day, the day indicators D1, D2, D3 D4 are to be selected by the user.

It is now described to increase the stop time automatically to be some fixed duration later than the start time when setting up a timer.

Usually it occurs the problem that when the user is setting up a new timer or is modifying an existing timer in Timer Setup Screen, all possible entries CH, STD, ETD must be entered, otherwise an error message will appear. According to the described embodiment by default the stop time ETD is set to one hour later than the start time STD with the input start time STI being the start time. If no start time STI is input, the current time is taken as start time STI. With this new proposal, the user is provided with a more convenient way to setup a timer with the duration PD the same as the fixed one by entering the start time only, such as 1 hour. It works this way: when user has entered the start time completely, i.e. all four digits of STD the end time ETD is updated automatically by advancing it one hour from the start time, since most of the time the user would setup timers with one hour duration. So user need not to enter an end time ETI if that is the record duration he wants. He can also change the end time ETD by entering another four digits.

The duration is pre-set in the system, of course it will be set to values other than the one hour if it is more desirable, e.g. based on some program duration statistics. The regular programs as drama or variety show are commonly one hour or half an hour long at least in US and Singapore.

When a new timer is set up, the Timer Setup Screen, as shown in FIG. 5b, is perforated with default values. The current channel, here channel 01 is used, the Current System Time, e.g. 13:56, is used for the default Start Time STD, and Current Time plus one hour as the default Stop Time ETD, here 14:56. And with the method according to the invention the device provides some-additional functions, which bring some convenience while setting up new timers. It is about to set the End Time ETC a pre-fixed amount of time the predetermined duration PD later than the actual Start Time STD automatically after the user completes the four digits entry of Start Time STI, so that the user needs not set the End Time ET if the automatically set End Time ETC suits his needs. Of course it is still possible to set a preferred end time, ET, thus overriding the calculated end time. Dependent on the timer frequency, the pre-fixed amount of time PD is 120 minutes for ONCE timers, as this event is most likely to be a movie, and 60 minutes for timers with other frequencies, as this duration is suitable for sitcoms, variety shows and the like. In order not to be too smart, this is only applicable to the new timers, not to the modified timers. Further, normally the End Time is set automatically only once. That means as long as the user does not navigate from STD to other buttons, but only highlights on Start Time Button STD and enters complete Start Time STI repeatedly or toggles the am/pm repeatedly, if available, the End Time ETD would update automatically according to the Start Time STD and the Frequency.

Here are some examples for the application of the method. FIG. 5c-e show a first example:

By default, the Frequency is ONCE, i.e. single event recording. Hence when the user opens up a new timer, the default End Time ETD would be PD=120 minutes later than the Start Time STD. Here, the current time is 08:20, thus STD=08:20 and ETD=10:20. The channel is channel 01. Now the user moves down to the Day Button, and changes the Frequency from D0 (single day) to D0-D5 i.e. Mon-Fri if the current day is Monday, see FIG. 5d. No change on Start time STD or Stop time ETD is done at this stage. Now the user enters 10:00 as Start Time, and the Stop Time updates to 11:00 automatically, as PD2=60 minutes is used for repeated event, see FIG. 5e. Without leaving the Start Time Button, the user now toggles am to pm, the Stop Time updates to 11:00 μm also (not shown), as the start time field has not been left. Further, without leaving the Start Time Button, the user changes the Start Time to 02:00 am, and the stop time automatically updates to 03:00 am (not shown here).

If now the user navigates away from the Start Time Button, maybe to change the frequency and comes back to set the Start Time STD, or goes to the Stop Time ETD and changes the Stop Time ETD and comes back to set the Start Time STD. Under both conditions, the end time ETD is not updated automatically again as the described navigation commands belong to a second type of commands that indicates that no further automatic update is desired. But user can enter their preferred ones.

FIG. 5c-e show a second example: By default, the Frequency is ONCE, i.e. single event recording. Hence when the user opens up a new timer, the default End Time ETD would be PD=120 minutes later than the Start Time STD. Here, the current time is 08:20, thus STD-08:20 and ETD=10:20. The channel is channel 01. Now the user moves down to the Day Button, and changes the Frequency from D0 (single day) to D0-D5 i.e. Mon-Fri, see FIG. 5*d*. No change on Start time STD or Stop time ETD is done at this stage. Now the user enters 10:00 as Start Time, and the Stop Time updates to 11:00 automatically as PD2=60 minutes is used for repeated event, see FIG. 5*e*. Now the user navigates away from the Start Time Button, and if he comes back to the Start Time Button again, the End Time does not update automatically but stays as in FIG. 5*e*, as the navigation command is taken as an indication that no further update is desired.

FIG. 6 shows in diagrammatic form the content of a removable medium 5. A first memory area contains the volume identification VID, a second memory area contains the file structure 6 and a third memory area is the data area 7 where several files 71 are stored.

FIG. 7 shows a menu 10 for a recording medium 8 which menu is displayed on display 2. Certain menu areas 21, 22, 23, 24 are provided to show an indication of different scenes SC1, SC2, SC3, SC4. In the figure one scene SC4 has been highlighted by double rim to indicate that this is the scene the user has navigated to.

The inventive video recording device is provided with a function for checking the change of removable media. PVR and DVD recording devices are often provided with a USB link 3 for connecting an external removable media device 4 (e.g. still picture camera equipped with flash media card). When the external removable media device 4 is connected to the PVR/DVD recorder 1, the file structure 6 of the removable medium 5 is loaded. However, if the removable medium 5 at the removable media device 4 is exchanged, the PVR/DVD recorder 1 does not recognize this change. From PCs there is known to use a "refresh" function, which is to be initiated by the user. Another solution to keep the file structure 6 in synchronism with the actually loaded removable medium 5 is to poll the file structure 6 periodically. An improved solution is desired.

The inventive device 1 checks for the volume identification VID of the removable media unit 4 every time a key is pressed at the PVR/DVD recording device 1, or a corresponding remote control or control unit. Preferably, this is done only when a key is pressed that causes an action on the removable media unit 4.

This has the advantage that processor time is saved in comparison to polling periodically. A dedicated "refresh" procedure is saved and, nevertheless, the correct file structure 6 is available whenever necessary, as each pressing of a key indicates a possible need of the correct file structure 6. The idea can advantageously be implemented for downloading JPEG or MP3 files from the data area 7 to the PVR/DVD recording device 1.

FIG. 9 shows the situation where a removable media unit 4, a card reader, is present as well as a flash card 5. However, the removable medium 5, here the flash card, comprises a wrong format or incompatible files. The existence of a problem with the card 5 is displayed on the display 2 as On Screen Display OSD. The user is expected to remove the card reader 4 or to re-plugin the card reader 4.

The OSD display 2 indicates a card problem, e.g. when it encounters a flash memory card 5 with format that is not supported by the device's file system or if the flash memory card 5 does not contain the files 71 or file types required by the device 1.

The flow chart of FIG. 10 shows the situation where a removable media unit 4, a card reader, is present and also a removable medium 5, a flash card, is present.

The OSD display 2 indicates that required files 71 are available. Whenever the user moves to a sub menu that is related to the removable medium 5, a check for the volume identification VID is performed. This ensures that a very low number of such check processes is performed. An alternative solution is to perform such check every time the user performs an action like navigating, entering data or commands or the like when being in a sub menu that is related to the removable medium. This has the advantage that check processes are performed whenever they seem to be likely, thus giving up-to-date information to the user while not blocking too much processing capacity.

In case that the volume identification VID has not changed, processing is continued, e.g. playback command or transfer command is accepted and performed and respective active processes are being continued.

In case that the volume identification VID has changed, a refresh process is performed. The user is informed about the new status, e.g. by means of the OSD 2. For a removable medium 5 that is newly inserted, the following is performed: check volume identification VID of each flash memory 5 inserted, if volume identification VID is NULL generate a random 4 byte identification code. Preferably, the random generation function is taken from screen saver's random coordination function and write it to the particular flash memory as volume identification VID.

The inventive device 1 has the advantage, that flash memory 5 can be safely removed or exchanged during idle mode, i.e. in a mode where the host, the inventive device 1, is not accessing the card reader 4, hence no command is send. When update of file structure 6 might be necessary, a checking process is performed. The result of the checking process is either, that the OSD 2 displays a warning that no card is inserted, or that a refresh for the flash memory is performed if a volume identification VID was detected.

In any of time while card 5 is playing/copying files 71 like jpeg or mp3, it will be unsafe to remove the flash memory 5. This will prompt "Improper Card Removal" display on OSD 1, to reactivate the reader 4 in this situation a re-plugin of the reader 4 to the link 3 is performed.

In case the removable medium does not provide the possibility to have a volume identification VID another possibility apart from the volume identification VID to identify presence of a different volume is to check for other characteristics that are quickly accessible and that provide high likelihood of correct identification.

The volume identification VID of the flash memory is checked every time the user is entering a USB sub-pic menu. This check is only done when the user presses a button on the remote control or an internal control till the selection of files 71 to play. The device, via microprocessor UP checks the volume identification VID at every stage till opening a file 71 for mp3/jpeg decoding.

The removable media device 4 may be of the multicard reader type. In this case, the removable media device 4 is provided with means to receive several removable media 5, 5', 5" as indicated by dashed lines in FIG. 1. The removable media 5, 5', 5" may be of the same type as well as of different type. Usually, only the content for a single one of the media 5, 5', 5" can be displayed on display 2. Displaying several tables of content for several media 5, 5', 5" would reduce the size of the characters to be used or would increase the complexity, which both is not acceptable for a consumer electronic device where the display 2 screen is arranged comparatively remote from the user.

One approach is to detect the first readable Logical Unit (LUN for accessing designated card 5 slot) and display its content. Hence the user can only access this card 5 slot. If the user decides to change to another card 5', 5" slot, he/she has to remove the card reader 4 from the player and to re-plugin again. This case will be troublesome if users are swapping cards 5, 5' 5" very often or if they are using more than one card 5, 5', 5".

According to the invention, if a multicard reader is inserted, the following steps are performed:

Read each card 5, 5', 5" slot to determine whether media 5, 5', 5" (e.g. flash memory) is inserted to a certain slot or not.

Read each media's 5, 5', 5" file system and generate a combined Table of Content (TOC) of file names for all media present.

OSD display 2 will display the content of media 5, 5', 5" as a whole volume.

With this solution it is solved the UI display problem of displaying all media 5, 5', 5" on screen as individual volume (just like PC) and it is saved all the trouble for the users as to refresh card 5, 5', 5" whenever they want to read difference card 5, 5', 5" slot.

FIG. 8 shows a block diagram with additional information. On the left side multiple card reader 4 is indicated being provided for being loaded with several removable media, namely card 5, card 5', card 5'" and card 5". Although all of these cards 5 to 5'" may be of the same type, the multiple card reader 4 depicted here is indicated as taking MMC and SD medium as card 5, smart media medium as card 5', compact flash medium as card 5'" and memory stick medium as card 5". If all of these are inserted in the multiple card reader 4, logical unit numbers LUN1 to LUN3 are present.

In the middle of FIG. 8 two tables of content for two different cards 5, 5" are shown. In this example it is assumed that card slots 5' and 5'" are not provided with a card so that only two logical unit numbers LUN0 and LUN1 are assigned. The table of content, also called file system, contains several files indicated here by file name 1, file name 2 . . . file name n. Of course, the number of files may be different for these tables of content.

On the right hand side of FIG. 8 the user interface display is shown. It displays a combined table of content for all media 5, 5". In case different media on a different number of media are present, the combined table of content contains the files of all the media 5 to 5'" present in removable media device 4.

Today user will need to unplug the USB card reader 4 from the machine 1 and plug it back to the machine again to do a card 5, 5', 5" reading (refresh card) if he had changed one of the cards 5, 5', 5" on the reader. An according aspect of the invention is, when the user presses ok now at the Memory Card Button (User Interface OSD) the removable media unit 4 or the device 1 will proceed to do a card reading again (refresh card) to check if a new card is being placed into the reader. This has as one advantage that the user now will not need to first disconnect the reader from the machine and reconnect the reader back to the machine to do a card refresh. This will also greatly reduce possible wear and tear cause to the USB connector on the machine as user will not need to plug/unplug the reader every time he changes the card. This is also useful for a reader 4 that has multiple slots, user will now be able to do a card refresh whenever he changes a card without need to plug/unplug the reader.

That means that the device 1 or the unit 4 will not only do a refresh when a same type of memory card is inserted with difference volume id, but also when the user requests to refresh the card.

This solution is a more interactive one between user and the system as the user can refresh the card at the main menu with 'OK' button pressed.

The invention claimed is:

1. A method for indicating a current loading status of a removable media device provided for being loaded with at least one removable medium, the at least one removable medium associated with a characteristic feature and the removable media device being connectable to a device for reading and/or writing AV storage media, comprising:
   detecting connection or disconnection of the removable media device;
   updating the current loading status of the removable media device in case a connection or disconnection of the removable media device is detected, the current loading status being different from the characteristic feature;
   checking whether a type of user input is related to the removable media device upon occurrence of user input, wherein the user input is not generated by the connection or disconnection of the removable media device;
   keeping the current loading status of the removable media device if the type of user input is not related to the removable media device;
   checking whether a characteristic feature of the at least one removable medium loaded in the removable media device has changed, if the type of user input is related to the removable media device;
   keeping the current loading status of the removable media device if the characteristic feature of the at least one removable medium loaded in the removable media device has not changed; and
   updating the current loading status of the removable media device if the characteristic feature of the at least one removable medium loaded in the removable media device has changed.

2. The method according to claim 1, wherein the characteristic feature is an identifier of the at least one removable medium.

3. The method according to claim 1, wherein user input types related to the removable media device are one or more of input command to enter removable media device sub-menu, input command to navigate within a removable media device sub-menu, input command to access a removable medium, and input command that generally is preceding an access to a removable medium.

4. The method according to claim 1, wherein checking whether a characteristic feature of the at least one removable medium has changed is performed repeatedly in case an error status has been detected.

5. The method according to claim 1, wherein identifiers of all removable media of a multicard reader type media device are checked.

6. The method according to claim 1, wherein, for a multicard reader type media device the file structure of all inserted removable media is read and assembled to a single file structure.

7. An apparatus for reading and/or writing AV storage media comprising:
   a connector for a removable media device having at least one removable medium, the removable medium associated with a characteristic feature the removable media device associated with a current loading status;
   a user input device that receives user input; and a controller that
- detects connection or disconnection of the removable media device,
- updates the current loading status of the removable media device in case a connection or disconnection of the removable media device is detected, the current loading status being different from the characteristic feature,
- checks whether a type of user input is related to the removable media device upon occurrence of user input, wherein the user input is not generated by the connection or disconnection of the removable media device,
- checks for a change in the characteristic feature of the at least one removable medium loaded in the removable media device when the type of user input is related to the removable media device, and
- updates the current loading status of the removable media device when the characteristic feature of the at least one removable medium loaded in the removable media device is changed.

8. The apparatus in claim 7, wherein the characteristic feature is an identifier of the removable medium.

9. The apparatus in claim 7, wherein the user input includes an input command to enter a removable media device's sub-menu, an input command to navigate within a removable media device's sub-menu, an input command to access a removable medium, and an input command that precedes access to a removable medium.

10. The apparatus in claim 7, wherein the controller checks whether a characteristic feature of the removable medium has been changed is repeated in case an error status has been detected.

11. The apparatus in claim 7, wherein the removable media device is a multicard removable media device; and wherein the controller checks identifiers of all removable media of the multicard removable media device.

12. The apparatus in claim 7, wherein the removable media device is a multicard removable media device; and wherein the controller reads file structures of all inserted removable media and assembles them into a single file structure.

* * * * *